United States Patent Office.

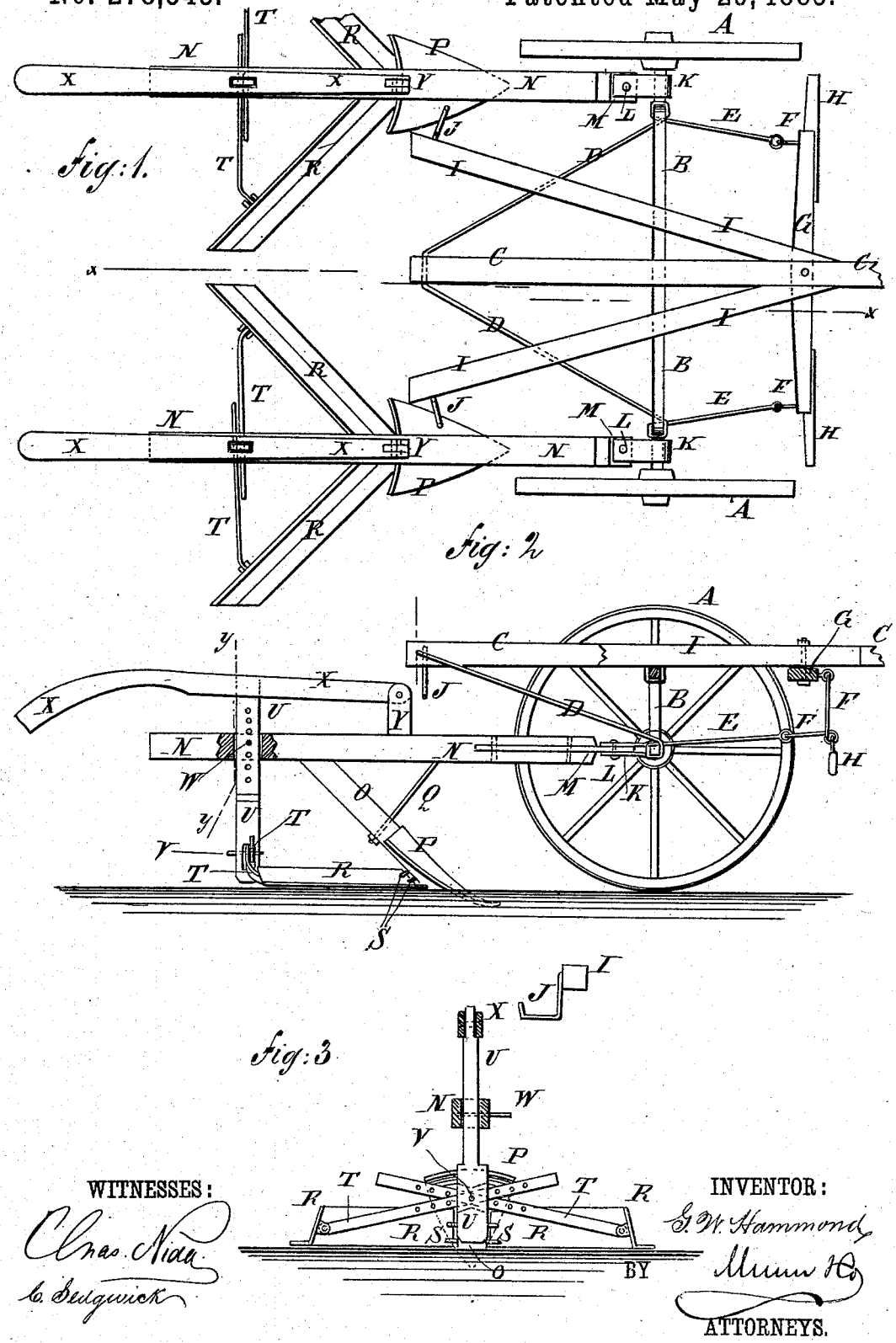

GEORGE W. HAMMOND, OF EARL PARK, INDIANA, ASSIGNOR OF ONE-HALF TO GEORGE W. HENRY, OF SAME PLACE.

CULTIVATOR.

SPECIFICATION forming part of Letters Patent No. 278,543, dated May 29, 1883.

Application filed October 20, 1882. (No model.)

*To all whom it may concern:*

Be it known that I, GEORGE WASHINGTON HAMMOND, of Earl Park, in the county of Benton and State of Indiana, have invented a new and useful Improvement in Cultivators, of which the following is a full, clear, and exact description.

Reference is to be had to the accompanying drawings, forming part of this specification, in which similar letters of reference indicate corresponding parts in all the figures.

Figure 1 is a plan view of my improvement. Fig. 2 is a sectional side elevation of the same, taken through the line $x\ x$, Fig. 1, and part being broken away. Fig. 3 is a sectional rear elevation of a part of the same, taken through the line $y\ y$, Fig. 2.

The object of this invention is to facilitate the cultivation of plants planted in rows, and also to promote convenience in adjusting the cultivators as the work to be done may require.

A are the wheels of the cultivator, the axle B of which is arched to adapt it to pass over tall plants without injuring them.

To the center of the axle B is attached the tongue C, the rear end of which projects, and which is strengthened in position by braces D, attached at their rear ends to the rear end of the said tongue C, and attached at their forward ends to the axle B at or near its lower angles.

To the axle B, at or near its lower angles, are attached the rear ends of the draw-rods E, the forward ends of which are connected with the lower ends of the supporting-rods F. The upper ends of the rods F are attached to the ends of the double-tree G, which is pivoted at its center to the tongue C, in the ordinary manner.

To the supporting-rods F, or to the forward ends of the draw-rods E, are attached the single-trees H. By this construction the draft will be applied to the axle B, and the single-trees will be supported above the plants, and thus prevented from breaking down or injuring the said plants. The tongue C is further strengthened against lateral strain by the hounds or braces I, the forward ends of which are attached to the opposite sides of the said tongue C at or near the point of attachment of the double-tree G. The hounds or braces I are attached to the axle B, and their rear ends project and have hooks J attached to them, to receive the plows and support the said plows above the ground when the machine is being taken from place to place.

K are two U-shaped straps, the bends of which pass around the axle B at the inner ends of the hubs of the wheels A.

To and between the arms of the straps K are hinged, by bolts or rivets L, the forward ends of the straps M, the rear ends of which are attached to the forward ends of the plow-beams N, so that the rear ends of the said plow-beams will have a free vertical and lateral movement.

To the rear part of each plow-beam N is attached the upper end of a standard, O, which inclines forward, and has a shovel-plow, P, or other suitable plow attached to its lower end. The standards O are strengthened against the draft-strain by braces Q, the lower ends of which are attached to the said standards, and their upper ends are attached to the plow-beams N.

The mold-boards or sweeps R are made long and narrow, and have their lower edge inclined forward, so as to be in proper position for cutting weeds and raising soil to throw around the plants. The forward ends of the mold-boards R are hinged to the opposite sides of the lower ends of the standards O by eye-bolts S, or other suitable means, so that the rear ends of the said mold-boards can have an outward and inward and an upward and downward adjustment.

To the inner sides of the outer ends of the mold-boards R are hinged the outer ends of bars T, the inner ends of which pass through slots in the lower ends of the hangers U, where they are secured in place by pins or bolts V passing through them and through the said hangers. Several holes are formed through the bars T to receive the pins V, so that the rear ends of the mold-boards R can be adjusted wider apart or closer together, as the distance apart of the rows of plants may require. The upper parts of the hangers U, or long tenons formed upon the said upper parts, pass through slots in the plow-beams N, where they are secured in place by set-screws, or by pins or bolts W, passing through the said plow-beam and through one of several holes formed through the said hangers, so that the said hangers can be raised and lowered as may be required. The upper ends of the hangers U are attached to levers X, placed above the plow-beams N, and the forward ends of which are hinged to studs Y, or other suitable supports, attached to the upper sides of the said beams N. The rear ends of the levers X project in the rear of the plow-beams N, and serve as handles for guiding the machine. With this construction the machine is drawn over every other row and cultivates the entire space between that row and the adjacent row upon each side, so that the machine will cultivate four rows at each round. With this construction, also, the machine can be readily adjusted to cultivate wide rows or narrow rows, and to hill the plants more or less, as may be required.

I am aware that mold-boards hinged in the rear of and to the standards of the plow or share and made adjustable laterally are not broadly new; but What I do claim as new and of my invention is—

In a cultivator, the combination of the handle or lever X, pivoted at the end to a beam-standard, Y, the hanger U, having a series of transverse perforations connected at the lower end with the wing-bars T, and attached to said lever, the beam N, vertically apertured and perforated transversely, and the pins W, whereby the wings may be raised or lowered alone or with the plow, as shown and described.

GEORGE WASHINGTON × HAMMOND.
his mark

Witnesses:
G. W. JEWELL,
C. H. KASSABAUM.